United States Patent
MacTaggart et al.

(10) Patent No.: US 11,250,207 B1
(45) Date of Patent: *Feb. 15, 2022

(54) DYNAMIC CREATION AND STORAGE OF NARRATIVES IN MULTIPLE LANGUAGES

(71) Applicant: IMDB.com, Inc., Seattle, WA (US)

(72) Inventors: Rachel Jane MacTaggart, Bristol (GB); Adam Carlson, Seattle, WA (US); Simon Alexander Poole, Bristol (GB); Richard David Williams, Monmouth (GB)

(73) Assignee: IMDB.COM, INC., Seattle, WA (US)

(*) Notice: Subject to any disclaimer, the term of this patent is extended or adjusted under 35 U.S.C. 154(b) by 75 days.

This patent is subject to a terminal disclaimer.

(21) Appl. No.: 16/216,119

(22) Filed: Dec. 11, 2018

Related U.S. Application Data

(63) Continuation of application No. 13/688,869, filed on Nov. 29, 2012, now Pat. No. 10,185,709.

(51) Int. Cl.
*G06F 40/186* (2020.01)
*G06F 40/20* (2020.01)
*G06F 40/40* (2020.01)

(52) U.S. Cl.
CPC .......... *G06F 40/186* (2020.01); *G06F 40/20* (2020.01); *G06F 40/40* (2020.01)

(58) Field of Classification Search
CPC ..... G06F 40/103; G06F 40/106; G06F 40/186
See application file for complete search history.

(56) References Cited

U.S. PATENT DOCUMENTS

| | | | | |
|---|---|---|---|---|
| 6,728,679 B1* | 4/2004 | Strubbe | ................... | G06F 3/011 |
| | | | | 704/270.1 |
| 7,613,690 B2* | 11/2009 | Chowdhury | ...... | G06F 16/90335 |
| 8,821,271 B2* | 9/2014 | Davison | .................. | A63F 13/54 |
| | | | | 463/1 |
| 9,697,178 B1* | 7/2017 | Nichols | .................... | G06F 40/35 |
| 10,185,709 B1* | 1/2019 | MacTaggart | ............ | G06F 40/58 |
| 10,540,430 B2* | 1/2020 | Locke | ................... | G06F 40/166 |
| 2003/0187925 A1* | 10/2003 | Inala | ..................... | G06F 40/174 |
| | | | | 715/758 |
| 2006/0178868 A1 | 8/2006 | Billerey-Mosier | | |
| 2007/0130010 A1 | 6/2007 | Pokonosky | | |
| 2011/0209047 A1* | 8/2011 | Olsen | ...................... | G06F 40/14 |
| | | | | 715/234 |

(Continued)

OTHER PUBLICATIONS

Jacob, M., Kuscher, A., Plauth, M., Thiele, C., "Automated data augmentation services using text mining, data cleansing and web crawling techniques", In: Proc. IEEE Congress on Services—Part I (2008), pp. 136-143 (Year: 2008).*

*Primary Examiner* — Ariel Mercado
(74) *Attorney, Agent, or Firm* — Thomas | Horstemeyer, LLP

(57) ABSTRACT

Disclosed are various embodiments for creating and providing narratives associated with a type of subject entity (e.g., person, movie, place, etc.). A narrative for the subject entity can be generated according to a narrative template. The narrative template can be selected based on a variety of factors. Following the selection of a narrative template, fields in the selected template are filled with stored data associated with the subject entity. The new or updated narrative may be stored in a memory. In response to a request for information related to the subject entity, the narrative can be transmitted to a client device.

20 Claims, 7 Drawing Sheets

---

203

[NAME]

[NAME] was born on [BIRTHDATE] in [BIRTHPLACE] as [REAL NAME]. [HE/SHE] was a [Role1], [Role 2], [Role 3] known for [KNOWN FOR]. [HE/SHE] was married to [SPOUSE] from [DATE of MARRIAGE] until [DATE OF DEATH/DATE OF DIVORCE] ([death/divorce]), with whom [he/she] had [NUMBER OF CHILDREN]. [He/She] passed away on [DATE OF DEATH] in [PLACE OF DEATH] ([CAUSE OF DEATH]).

118a

(56) References Cited

U.S. PATENT DOCUMENTS

| | | |
|---|---|---|
| 2011/0246182 A1 | 10/2011 | Allen |
| 2011/0282649 A1 | 11/2011 | Waksberg et al. |
| 2011/0320191 A1 | 12/2011 | Makeyev |
| 2013/0325897 A1* | 12/2013 | Motgi ................. G06F 16/9535 707/776 |
| 2014/0120510 A1 | 5/2014 | Blanchard |

* cited by examiner

203

[NAME]

[NAME] was born on [BIRTHDATE] in [BIRTHPLACE] as [REAL NAME]. [HE/SHE] was a [Role1], [Role 2], [Role 3] known for [KNOWN FOR]. [HE/SHE] was married to [SPOUSE] from [DATE of MARRIAGE] until [DATE OF DEATH/DATE OF DIVORCE] ([death/divorce]), with whom [he/she] had [NUMBER OF CHILDREN]. [He/She] passed away on [DATE OF DEATH] in [PLACE OF DEATH] ([CAUSE OF DEATH]).

DYNAMIC CREATION AND STORAGE OF NARRATIVES IN MULTIPLE LANGUAGES

CROSS REFERENCE TO RELATED APPLICATIONS

This application claims priority to U.S. Patent Application entitled, "Dynamic Creation and Storage of Narratives in Multiple Languages," filed Nov. 29, 2012, and assigned application Ser. No. 13/688,869, now U.S. Pat. No. 10,185, 709, which is incorporated herein by reference in its entirety.

BACKGROUND

In today's technological society, many people resort to online resources to obtain information pertaining to a variety of subjects. However, following a change regarding a particular subject entity, a system may need to update its information to remain accurate. If information is vast, the task of keeping things up-to-date may be problematic.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 2 is a drawing of an example of a narrative template according to various embodiments of the present disclosure.

DETAILED DESCRIPTION

Figure 1:
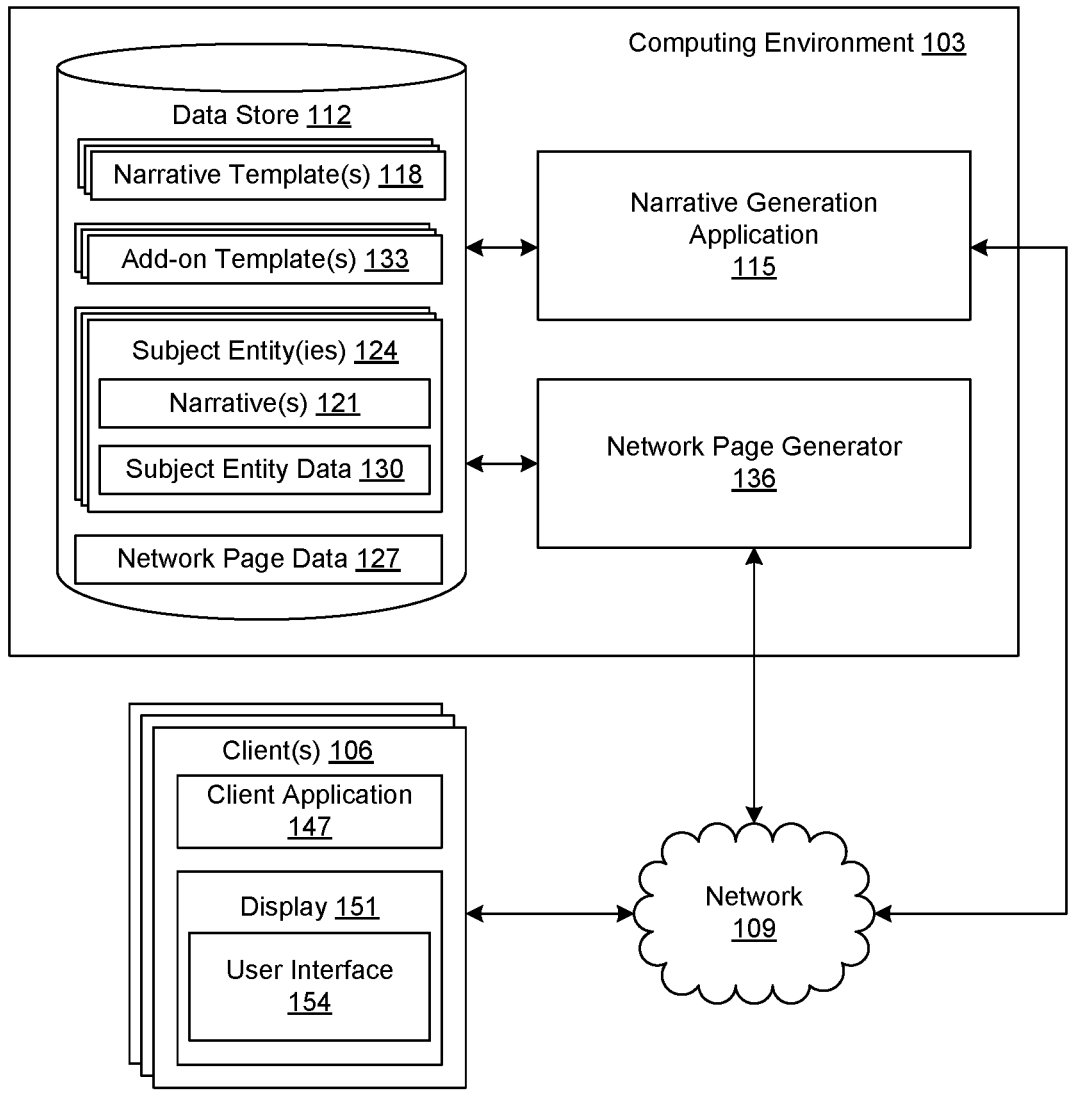
FIG. 1 is a drawing of a networked environment according to various embodiments of the present disclosure.

Assume a user would like to obtain biographical information relating to a particular individual, such as, for example, a celebrity. One way a user may obtain this information may be by accessing a network page that may provide a narrative associated to the celebrity. While there may exist a database that already includes one or more pre-generated narratives associated with the requested celebrity, a lifestyle change relating to the celebrity may have recently occurred that may make the previously generated narrative out-of-date, and therefore, inaccurate. Additionally, a database containing one or more narratives associated with multiple celebrities may be very large, and therefore, difficult to manage and keep up-to-date.

The present disclosure relates to dynamically creating, updating, displaying and/or storing narratives about a subject entity based on narrative templates with the purpose of providing users accurate and relevant information associated with the subject entity. The subject entities may include for example, individuals, movies, television shows, theatrical works, songs, music albums, or any other type of subject.

In various embodiments, a system may select the most optimal narrative template from a variety of different templates based at least on a subject entity. Some of the factors that may be used in selecting the optimal narrative template may include, for example, popularity of the subject entity, a type of language, a type of client device, number of available data elements associated with the subject entity, at least one user interest, the content of the data elements, the nature of the network page to be rendered on a client device and other information pertaining to a user and/or subject entity. Following the selection of the narrative template, the system may generate a narrative using the selected template and data elements associated with the subject entity. The narrative may be stored in a memory to be provided in response to requests. The narrative may also be generated for display on a client device in real time in response to a request.

Additionally, an add-on narrative may be similarly generated in real-time to reflect further information that may be interesting to the user based on the user's location, specific interests, and/or other information relative to the user. For example, while a base narrative may already be previously generated and stored relative to the subject entity, one or more factors may trigger the need for additional information. Based on the need for additional information, the system may generate an add-on narrative to add to the base narrative.

In another embodiment, following a change associated with a data element or some external event, such as, for example, a death of a celebrity or particular date, a system may create a new narrative to reflect the change, and determine whether to replace a previously stored narrative associated with the subject entity (i.e., the celebrity). When a celebrity dies, any prior narrative may need to be changed so that references to the celebrity are in the past tense instead of the present tense. Additionally, if the date is an anniversary of a particular death or event, a system may create a narrative to reflect the particular sensitivities associated with the particular date. The system may also to update the narrative in multiple languages so that the information is accessible worldwide.

In the following discussion, a general description of the system and its components is provided, followed by a discussion of the operation of the same.

With reference to FIG. 1, shown is a networked environment 100 according to various embodiments. The networked environment 100 includes a computing environment 103, and a plurality of clients 106, which are in data communication via a network 109. The network 109 includes, for example, the Internet, intranets, extranets, wide area networks (WANs), local area networks (LANs), wired networks, wireless networks, or other suitable networks, etc., or any combination of two or more such networks.

The computing environment 103 may comprise, for example, a server computer or any other system providing computing capability. Alternatively, the computing environment 103 may employ a plurality of computing devices that may be employed that are arranged, for example, in one or more server banks or computer banks or other arrangements. Such computing devices may be located in a single installation or may be distributed among many different geographical locations. For example, the computing environment 103 may include a plurality of computing devices that together may comprise a cloud computing resource, a grid computing resource, and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a data store 112 that is accessible to the computing environment 103. The data store 112 may be representative of a plurality of data stores 112 as can be appreciated. The data stored in the data store 112, for example, is associated with the operation of the various applications and/or functional entities described below.

The components executed on the computing environment 103, for example, include narrative generation application 115, a network page generator 136, and other applications, services, processes, systems, engines, or functionality not discussed in detail herein. The narrative generation application 115 is executed to dynamically create and/or update narratives associated with a variety of subjects, and potentially other functions. The network page generator 136 may serve up network pages, such as web pages that are encoded for rendering on clients 106.

The data stored in the data store 112 includes, for example, narrative template(s) 118, add-on templates(s) 121, subject entity(ies) 130, network page data 127, and potentially other data. Narrative templates(s) 118 comprise templates that are used to generate narratives about a subject such as a person. Narrative templates 118 may include a family of templates for generating a common narrative in multiple different languages including, for example, French, Spanish, German, Mandarin, Italian, and any other language. Add-on template(s) 133 comprise templates that may be used to supplement previously created narratives with additional information. Subject entity(ies) 124 reference subjects such as for example, individuals, places, movies, television shows, and/or other types of subjects. Associated with a subject entity 124 is on or more narratives(s) 121, subject entity data 130 and/or other information relating to the subject entity 124. The narrative(s) 121 comprises created narratives providing information associated with a subject entity 124. The narratives 121 associated with the subject entity 124 may include multiple narratives that may be grouped by languages, type of client devices used to render such narratives, nature of network page to be rendered on a client device, and/or any other type of factor relating to the narratives 121. Subject entity data 130 may include may include, for example, name, gender, birthdate, birth place, spouse, career span, awards received, and/or any other information associated with the subject entity 124.

Network page data 127 may include any data relating to network pages, served up by the network page generator 136. To this end, network page data 127 may include static network page or static elements of network pages, for example, in hypertext markup language (HTML), extensible markup language (XML), and/or any other language suitable for creating network pages. Further network page data 127 may include code that generates dynamic network pages when executed or interpreted in the computing environment 103. Such code may be written in any suitable programming language, such as PHP, Perl, Objective C, JAVA®, Ruby, etc. Network page data 127 may also include code configured to be executed or interpreted within a client 106 in order to render a dynamic network page. Such code may be referred to as applets and may be written in any suitable programming language, such as JAVASCRIPT®, JAVA®, etc.

A network page may include a narrative 121 associated with a particular subject entity 124. The network page generator 136 may make calls to the narrative generation application 115 to obtain the appropriate narrative to include in the network page. For example, assume a user desired to view a narrative for a particular celebrity. The user may access a network page that is generated by the network page generator 136 and includes the appropriate narrative associated with the requested celebrity as obtained from the narrative generation application 115.

The client 106 is representative of a plurality of client devices that may be coupled to the network 109 The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 106 may include a display 151. The display 151 may comprise, for example, one or more devices such as liquid crystal display (LCD) displays, gas plasma-based flat panel displays, organic light emitting diode (OLED) displays, LCD projectors, or other types of display devices, etc.

The client 106 may be configured to execute various applications such as a client application 147 and/or other applications. The client application 147 may be executed in a client 106 for example, to access network content served up by the computing environment 103 and/or other servers, thereby rendering a user interface 154 on the display 151. The client application 147 may, for example, comprise a browser, a mobile application, etc., and the user interface 154 may correspond to a network page, a mobile application screen, etc. The client 106 may be configured to execute applications beyond the client application 147 such as, for example, email applications, social networking applications, and/or other applications.

Next, a general description of the operation of the various components of the networked environment 100 is provided. To begin, a user may want to obtain information pertaining to a particular subject entity, for example, a celebrity. In order to satisfy the user's request, a system may serve up information on a subject entity 124 in the form of a narrative. However, because subject entity data 130 associated with the subject entity 124 may change over time due to a particular condition, such as, for example, a lifestyle change, the change may necessitate one or more narratives 121 to be dynamically updated or created.

In some embodiments, the narrative generation application 115 may detect a condition in the subject entity data 130 associated with a subject entity 124. The condition may be a change in the data, an addition of at least one element to the subject entity data, a deletion of at least one element in the subject entity data 130 or any other type of condition associated with the subject entity 124. The condition may necessitate a change in an existing narrative or the creation of a new narrative. For example, the death of a celebrity may cause a trigger to update and/or create narratives based on the death of the celebrity.

However, the narrative generation application 115 may also detect a condition that is external to the subject entity data 130, yet still associated with the subject entity. For example, narrative generation application 115 may detect that the date is the ten year anniversary of a subject entity's death. Due to this detection, the narrative generation application 115 may update and/or create narratives that are written such that particular sensitivities associated with the time period are reflected in the narratives.

In order to generate a new narrative, the narrative generation application 115 may then select the appropriate narrative template from narrative templates 118. The selection of the appropriate narrative template may be based on at least one factor such as, for example, a language, popularity of subject entity, type of client device on which the narrative is to be rendered, interest of a user, amount of available data elements associated with the subject entity data 130 associated with the subject entity 124, the content of the data elements, the nature of the network page to be rendered on a client device, or other factors.

For example, with respect to actors, the narrative for a popular and accomplished actor such as Tom Cruise might include more information regarding popular movie roles and charitable involvement than a narrative for an actor who has only had a small role in a short-lived television series. Therefore, there may be one narrative template 118 (FIG. 1) that only contains standard information pertaining to an actor's name, birthdate, gender and job roles, while another narrative template 118 may include additional information about a subject entity 124 (FIG. 1), such as, for example, known for data, filming locations, awards nominated, awards received, charitable involvement. The more popular a subject entity 124, the more information a user might find interesting regarding the subject entity 124.

In another non-limiting example, the narrative generation application 115 may select a narrative template 118 (FIG. 1) based on the amount of available data elements in the subject entity data 130 (FIG. 1) associated with a subject entity 124 (FIG. 1). For example, if the subject entity data 130 associated with a subject entity 124 only includes a subject entity's name, birthdate, and birth place, the narrative generation application 115 may select a narrative template 118 containing minimal blank data fields 203 (FIG. 2) relevant to the available data elements. Additionally, if there are many data elements stored in subject entity data 130 associated with the subject entity 124, then the narrative generation application 115 may select a more detailed narrative template 118 with a greater number of data fields.

In another non-limiting example, the narrative generation application 115 may select a narrative template 118 (FIG. 1) based on the type of client device on which a narrative is to be rendered. In a non-limiting example, it may be more preferable to display a narrative 121 (FIG. 1) with less information on a mobile device than on a desktop computer due to screen size. Therefore, narrative generation application 115 may select a narrative template 118 that is more suitable for a mobile device if it is creating a narrative 121 for display on a mobile device. Likewise, a narrative 121 created for display on a desktop computer, may include additional information. Therefore, the narrative generation application 115 may select an alternative narrative template 118 for generating a narrative 121 for display on a desktop computer than a narrative template 118 selected for generating a narrative 121 for display on a mobile device.

In another non-limiting example, the narrative generation application 115 may determine the appropriate narrative template 118 (FIG. 1) based on a type of language. For example, a narrative 121 (FIG. 1) may be created in French for users who speak French. If the narrative 121 is to be written in French, then the narrative generation application 115 may select from narrative templates 118 written in French. Likewise, for narratives 121 to be written in German, the narrative generation application 115 may select from narrative templates 118 written in German.

Additionally, the narrative generation application 115 may translate data elements of the subject entity data 130 associated with the subject entity 124. For example, if the narrative template selected is written in German, the related data elements may need to be translated to German so that the narrative is accurately presented to the user in German. The narrative generation application 115 may also determine the need to convert relevant data elements based on a locality. For example, while some localities may use the metric system for measurement, another locality may use the imperial system. In another example, while one person's weight may be listed for one locality to be one-hundred and twenty pounds, another locality may better understand the measurement if converted to fifty-four kilograms.

In some embodiments, each narrative template 118 may include multiple sentences. In addition, each sentence may include at least one blank data field 203 (FIG. 2). Further, each template 118 may also include variations of each sentence. For example, the narrative template 118 may include the following variations of a first sentence: (1) "[NAME] was born on [BIRTHDATE] in [BIRTHPLACE] as [REAL NAME]." and (2) "[NAME] was born on [BIRTHDATE] in [BIRTHPLACE]." If the subject entity data 130 associated with the subject entity only includes a name, birthdate, birthplace, but fails to include a real name, the narrative generation application 115 may select the second sentence.

Following the selection of a narrative template 118, the narrative generation application 115 may generate a narrative using the data fields 203 in the selected narrative template 118. For example, and explained in further detail with reference to FIG. 6, blank data fields in the template may be filled with corresponding information in the subject entity data 130 associated with the subject entity 124. In some embodiments, there may not be any data fields to fill in at least one of the sentences of the narrative template 118.

In some embodiments, the narrative generation application 115, may determine whether other narratives would need to be created based on the condition, such as, for example, a lifestyle change in the subject entity data 130. For example, assume the subject entity 124 is a celebrity, and that the condition is the death of the celebrity. Upon detection of the condition, the narrative generation application 115 may need to dynamically create narratives 121 in multiple languages and for multiple client devices to reflect the change for all users who may access the narrative 121. Therefore, the narrative generation application 115 may have to generate multiple narratives 121 based on the condition for the given individual.

In another embodiment, a user at a client 106 may request to view a narrative 121 of a subject entity 124 from a network page 127 on a network site from a narrative generation application 115 over the network 109. In one non-limiting example, the narrative generation application 115 may obtain from the request additional information regarding the locality of the client 106, the language used on the client 106, the type of client device, and/or any other information pertaining to the client. After receiving the information from the client 106 over the network 109, the narrative generation application 115 may select the most optimal narrative 121 associated with the identified subject entity 124.

For example, if the client 106 is a mobile device and the corresponding language is French, the narrative generation application 115 may select the narrative 121 associated with the identified subject entity 124, where the narrative 121 is written in French for a mobile device. Likewise, if the client 106 is a laptop computer and the corresponding language is English, the narrative generation application 115 may select the narrative 121 associated with the subject entity 124 where the narrative is in English and created for display on a laptop computer.

Additionally, in some embodiments, the narrative generation application 115 may determine that additional information may be presented to the user on the client 106. For example, while a base narrative may already be available, the narrative generation application 115 may determine to provide additional information to the user based on a variety of factors. As such, the narrative generation application 115 may select an appropriate add-on template 133, which may be used to generate an add-on narrative to add to the base narrative for display. The factors for the selection of an optimal add-on template may include locality of the user, a type of user interest, or any other type of factor relating to the request to view a narrative from the client 106.

For example, if the narrative generation application 115 determines that the client 106 is located in Boston, Mass. and the subject entity 124 filmed a movie in Boston, it may be appropriate to add that information to the selected narrative 121. In a non-limiting example, there may be an add-on template that recites "[NAME] starred as [CHARACTER NAME] in [MOVIE TITLE] which was filmed in your current location, [LOCATION OF FILMING]." The narrative generation application 115 may generate an add-on narrative based on this sentence using the blank data fields and corresponding subject entity data 130. Therefore if the subject entity is Matt Damon, the add-on sentence may recite "Matt Damon starred as Colin Sullivan in The Departed which was filmed in your current location, Boston, Mass., USA." The narrative generation application 115 may then add the generated add-on narrative to the selected narrative 121 for display on the client 106. In another non-limiting example, the add-on template may not have any data fields, and may be added on to the selected narrative 121.

In some embodiments, the narrative generation application 115 may encode the selected narrative associated with a subject entity 124 on a network page to be rendered on a user interface 154 on the client 106. The selected narrative may include the add-on narrative. Additionally, the narrative generation application 115 may send the network page including the selected narrative to the client 106 over the network 109.

Referring next to FIG. 2, shown is a drawing of an example of a narrative template 118 (FIG. 1). The narrative template 118 is used by the narrative generation application 115 (FIG. 1) to generate a narrative. In various embodiments, the narrative template 118 may include at least one blank data field 203, where the at least one blank data field 203 corresponds to an element in the subject entity data 130 (FIG. 1).

Figure 3A:
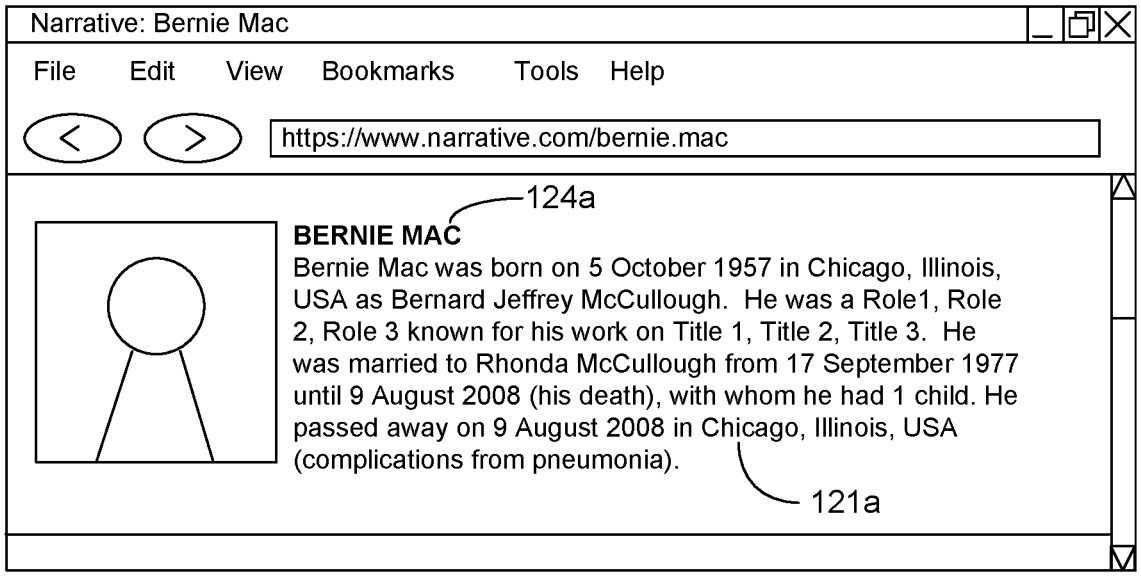
FIGS. 3A-3B are drawings of examples of user interfaces rendered by a client in the networked environment of FIG. 1 according to various embodiments of the present disclosure.

Turning now to FIG. 3A shown is a drawing of an example of a user interface 154 (FIG. 1) rendered by a client 106 (FIG. 1), in the networked environment 100 (FIG. 1) according to various embodiments of the present disclosure. In particular, FIG. 3A depicts a non-limiting example of an English narrative page 300 rendered by the client application 147 (FIG. 1) executing on the client 106. The English narrative page 300 may comprise, for example, a pop-over window, a pop-under window, a separate window of the client application 147, a logical window comprising a portion of a primary window of the client application 147, or other type of view. The English narrative page 300 may include a narrative 121a (FIG. 1) and/or other information or links relating to the subject entity 124a (FIG. 1).

Figure 3B:
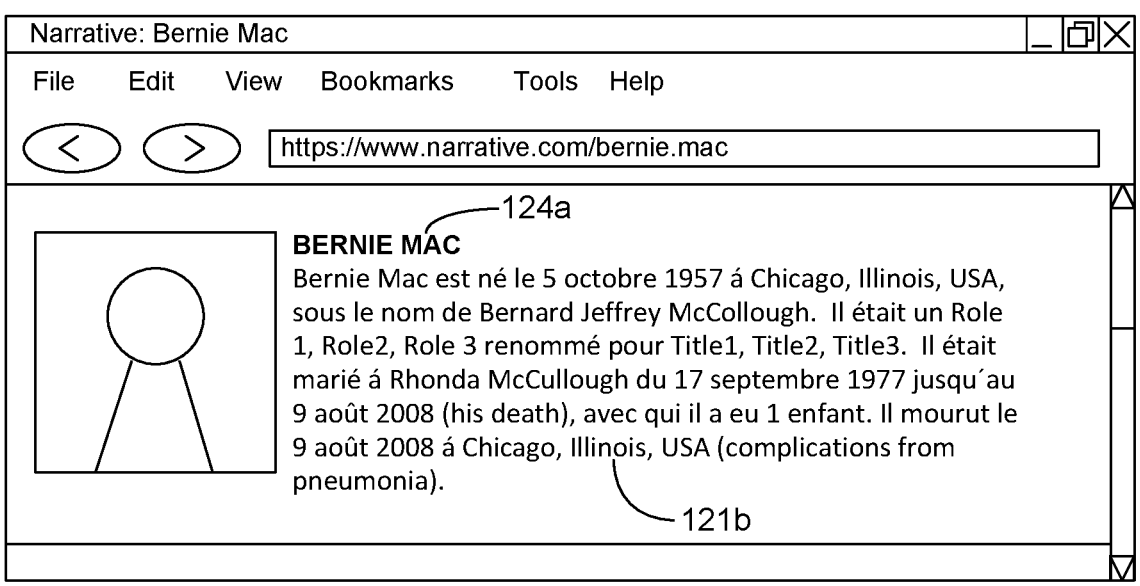

Moving on to FIG. 3B, shown is shown is a drawing of an example of a user interface 154 (FIG. 1) rendered by a client 106 (FIG. 1), in the networked environment 200 (FIG. 1) according to various embodiments of the present disclosure. In particular, FIG. 3B depicts a non-limiting example of a French narrative page 303 rendered by the client application 147 (FIG. 1) executing on the client 106. The French narrative page 300 may comprise, for example, a pop-over window, a pop-under window a separate window of the client application 147, a logical window comprising a portion of a primary window of the client application 147, or other type of view. The French narrative page 300 may include a narrative 121b (FIG. 1) and/or other information or links relating to the subject entity 124a (FIG. 1).

Figure 4:
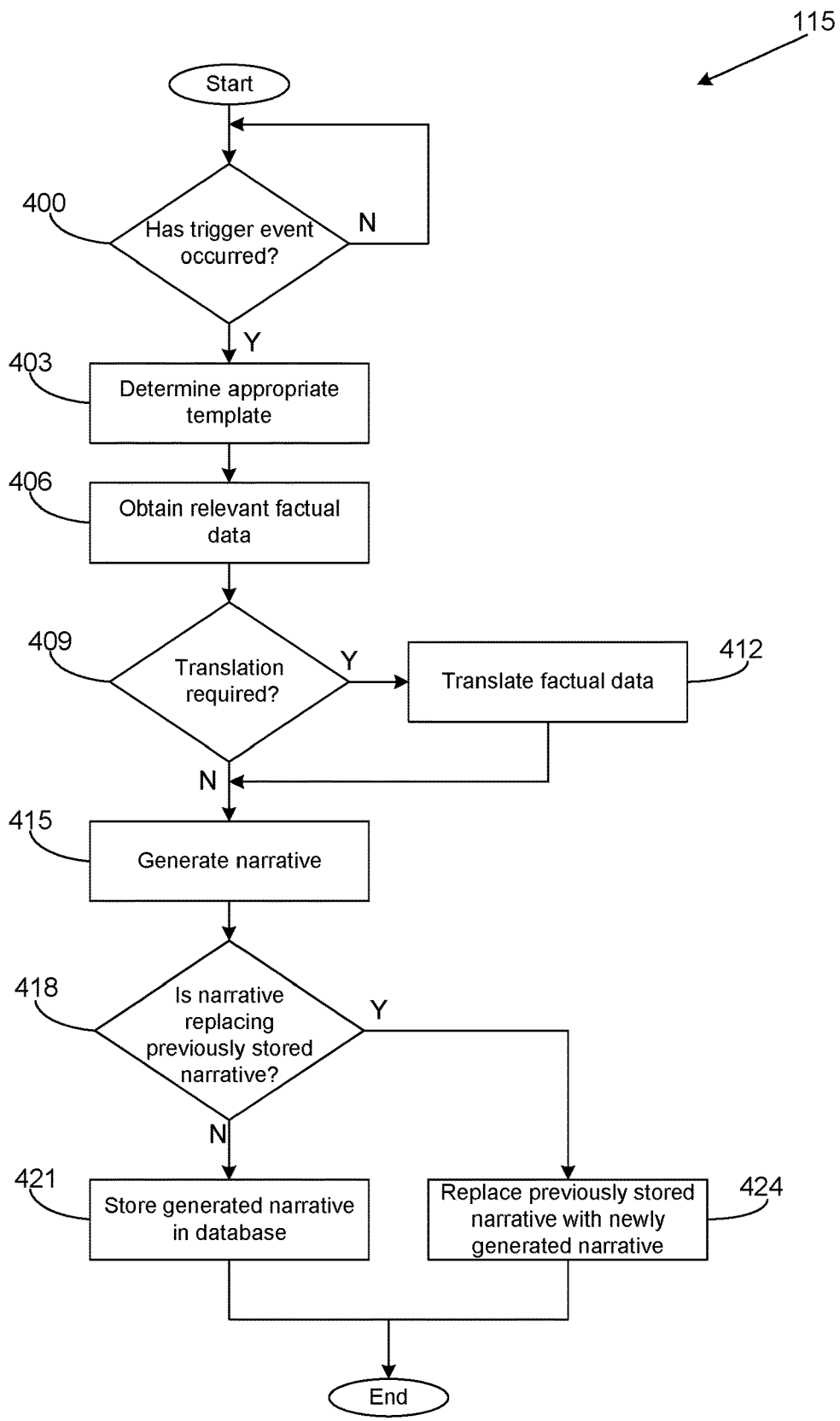
FIGS. 4-6 are flowcharts illustrating examples of functionality implemented as portions of the narrative generation application executed in a computing environment in the networked environment of FIG. 1 according to various embodiments of the present disclosure.

Referring next to FIG. 4, shown is a flowchart that provides one example of the operation of a portion of the narrative generation application 115 according to various embodiments. It is understood that the flowchart of FIG. 4 provides merely an example of the many different types of functional arrangements that may be employed to implement the operation of the portion of the narrative generation application 115 as described herein. As an alternative, the flowchart of FIG. 4 may be viewed as depicting an example of steps of a method implemented in the computing environment 103 (FIG. 1) according to one or more embodiments.

FIG. 4 provides an example of the functionality that may be performed when a condition occurs that is associated with a subject entity 124 (FIG. 1) that necessitates the creation of one or more narratives about the subject entity 124. Following detection of the condition, the narrative generation application 115 generates one or more narratives to accurately reflect the condition associated with the subject entity 124.

Beginning with box 400, the narrative generation application 115 determines whether a trigger event that would require the creation and/or update of a narrative 121 (FIG. 1) associated with a subject entity 124 (FIG. 1) has occurred. In a non-limiting example, the trigger event could be the addition of at least one new element to the subject entity data 130 (FIG. 1), the removal of at least one of the elements in the subject entity data 130, a change in at least one of the data elements in the subject entity data 130, or any other condition associated with the subject entity 124.

For example, assume the subject entity 124 refers to Tom Cruise. When Tom Cruise divorced Katie Holmes in November 2012, his marital status changed from married to single. The change in Tom Cruise's marital status rendered all biographical narratives stating that stated the actor was currently married to Katie Holmes inaccurate. Accordingly, any change in the marital status or spouse elements of the subject entity data 130 (FIG. 1) associated with Tom Cruise may be detected by the narrative generation application 115 so that a new accurate narrative 121 (FIG. 1) could be generated.

In another non-limiting example, a detected condition could simply be a change in popularity of movies that are associated with a subject entity 124 (FIG. 1). For example, if a narrative 121 (FIG. 1) includes the three most popular films in which actor has starred, and a new released movie starring the same actor changes the popularity ranking of the films, the narrative generation application 115 may detect the change and create a narrative 121 reflecting the updated popularity ranking.

In another non-limiting example, the condition could be the detection of an external event. For example, the narrative generation application 115 may associate a date or a range of dates with the anniversary of a particular event such as, for example, a death, marriage, accident, or other event associated with a date. Upon the detection, the narrative generation application 115 may determine that a narrative 121 should be updated or created to reflect particular sensitivities associated with the external event. Another example of an external event may be where an external system initiates an update or re-write of a narrative 121 (e.g. operator control).

The narrative generation application 115 waits at box 400 until the detection of a trigger event, such as a change in the lifestyle data associated with a subject entity 124. Upon detection of a trigger event the narrative generation application 115 proceeds to box 403.

In box 403, the narrative generation application 115 determines the appropriate template 118 (FIG. 1) to use in creating an accurate narrative associated with a subject entity 124 (FIG. 1). The selection of the appropriate narrative template may be based on one or more factors such as, for example, a language, popularity of subject entity, type of client device, interest of a user, amount of data elements available in the subject entity data 130 associated with the subject entity 124, content of the subject entity data 130, nature of a network page to be rendered on a client device or any factor associated with the subject entity 124, user and/or client 106.

For example, the narrative generation application 115 determines that the appropriate narrative language should be French. Therefore, the narrative generation application 115 will select a narrative 121 associated with the subject entity 124 that is written in French. There may be only one narrative template 118 written in French, or there may be multiple narratives written in French. If there are multiple narratives templates 118, the narrative generation application 115 may further base its selection on the other factors such as popularity of the subject entity, type of client device, interest of the user, amount of data elements in the subject entity data 130 or any other factor associated with the subject entity 124, user and/or client 106.

Following the selection of a narrative template 118, the narrative generation application 115 proceeds to box 406.

In box 406, the narrative generation application 115 obtains a subset of data elements from the subject entity data 130 (FIG. 1) associated with the subject entity 124 (FIG. 1) based on the selected template 118 (FIG. 1). In a non-limiting example, the subset of data elements obtained from the subject entity data 130 associated with a subject entity 124 may include all of the data elements in the subject entity data 130 or a selection of the data elements in the subject entity data 130. For example, if the narrative template 118 was selected based on the type of client device being a mobile device rather than a desktop computer, the narrative template 118 may be shorter with fewer data fields 203 (FIG. 2). Therefore, while the subject entity data 130 associated with a subject entity 124 may include multiple data elements, only the data elements required for the data fields 203 in the narrative template 118 for the mobile device will be retrieved. After obtaining the subset of data elements of the subject entity data 130, the narrative generation application 115 proceeds to box 409.

In box 409, the narrative generation application 115 determines whether the subset of data elements from the subject entity data 130 (FIG. 1) needs to be translated. For example, if the narrative template is in French and the subset of data elements of the subject entity data 130 are in English, the narrative generation application 115 may determine that at least one of the subset data elements from the subject entity data 130 in English should be translated to French. If the narrative generation application 115 determines that at least one of the subset of data elements of the subject entity data 130 should be translated, the narrative generation application 115 proceeds to box 412. However, if the narrative generation application 115 determines that none of the data elements of the subject entity data 130 require translation, then the narrative generation application 115 proceeds to box 415.

In box 412, the narrative generation application 115 translates any of the subset of data elements of the subject entity data 130 (FIG. 1) associated with a subject entity 124 (FIG. 1) that the narrative generation application 115 determined required translation. In a non-limiting example, if a subject entity's birth month is October and the narrative template is in French, the narrative generation application 115 may translate "October" to "octobre" to reflect the French translation. Once the selected subset of data elements that require translation have been translated, the narrative generation application 115 proceeds to box 415.

Figure 5:
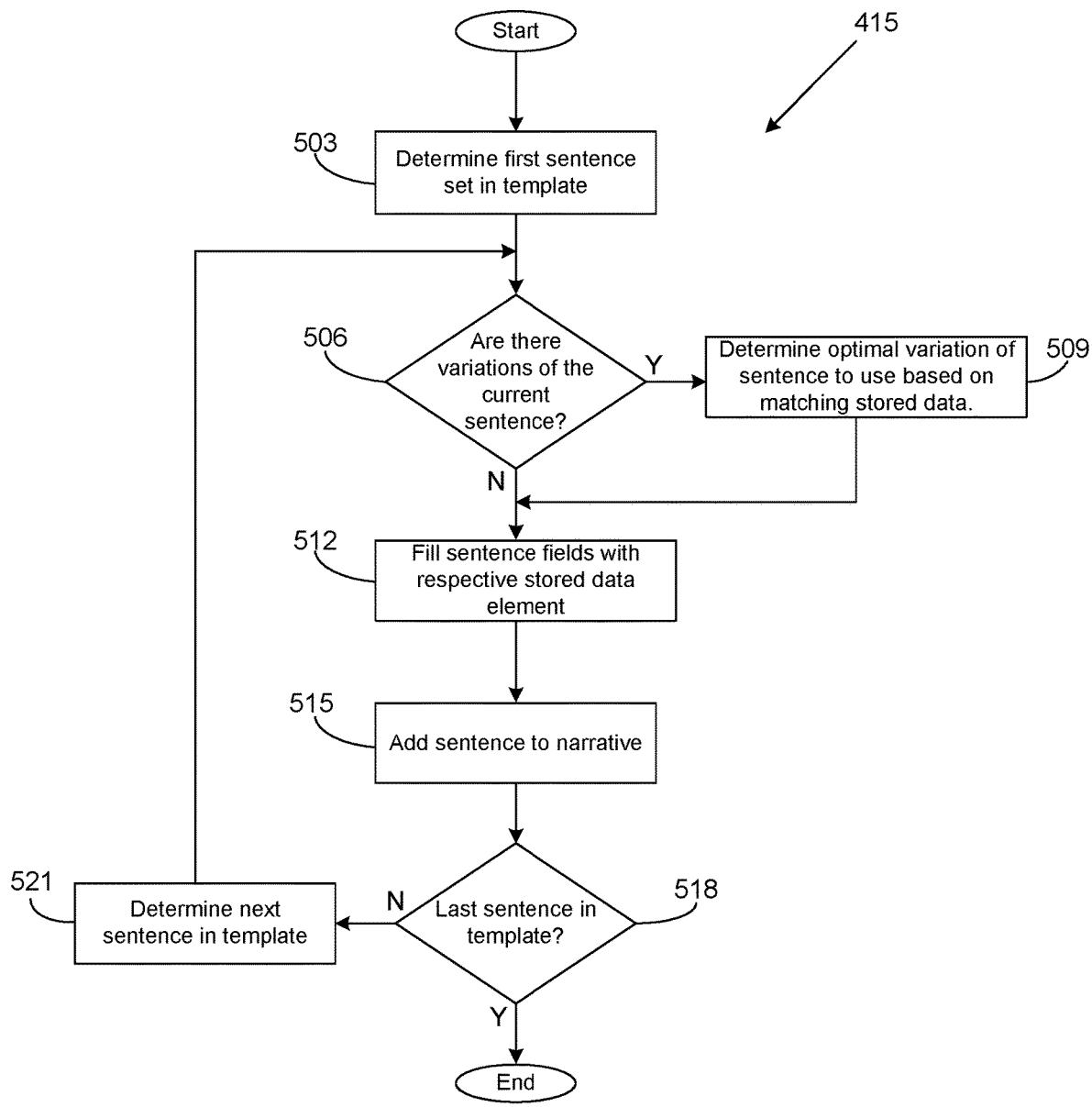

In box 415, the narrative generation application 115 generates a narrative associated with a subject entity, as discussed in more detail relative to FIG. 5. In one non-limiting example, the narrative generation application 115 creates a narrative associated with the subject entity by filling in the data fields 203 in the selected narrative template 118 with the corresponding data element of the subject entity data 130 associated with the subject entity 124.

In another non-limiting example, the narrative template 118 (FIG. 1) may include multiple variations of at least one sentence in the template 118. For each sentence of the narrative template 118, the narrative generation application 115 may select an optimal sentence based on data elements available for the subject entity data 130 (FIG. 1). The multiple variations of at least one sentence in the template 118 reflect that data available may vary from one subject entity 124 to another. Following the selection of each optimal sentence, the narrative generation application fills the data fields 203 (FIG. 2) with the corresponding data elements to create the narrative 121 (FIG. 1).

Following the generation of the narrative, the narrative generation application 115 proceeds to box 418.

In box 418, the narrative generation application 115 determines whether the narrative 121 (FIG. 1) should replace a previously stored narrative 121 associated with the subject entity 124 (FIG. 1). In a non-limiting example, the narrative generation application 115 may determine if a similar, albeit obsolete due to the condition, narrative 121 already exists. If the narrative generation application 115 determines that the generated narrative should replace a previously stored narrative 121 associated with the subject entity 124, the narrative generation application 115 proceeds to box 424. However, if the narrative generation application 115 determines that the newly generated narrative 121 does not need to replace another narrative 121 associated with the subject entity 124, then the narrative generation application proceeds to box 421.

In box 424, the narrative generation application 115 replaces a previously stored narrative 121 (FIG. 1) associated with the subject entity 124 (FIG. 1) with the generated narrative created in box 415. For example, the detected trigger event could have been the death of a subject entity 124, and the generated narrative reflects the death of the subject entity 124. However, a previously stored narrative 121 may be similar to the generated narrative, but fails to reflect the death, and is written in present tense. The narrative generation application 115 may remove the previously stored narrative 121, and subsequently store the generated narrative. After the generated narrative is stored, the narrative generation application 115 ends.

In box 421, the narrative generation application 115 stores the generated narrative in a memory. After storing the generated narrative the narrative generation application 115 ends.

Referring next to FIG. 5, shown is a flowchart that provides one example of the operation of a portion of the narrative generation application 115 according to various embodiments. It is understood that the flowchart of FIG. 5 provides merely an example of the many different types of functional arrangements that may be employed to implement the operation of the portion of the narrative generation application 115 as described herein. As an alternative, the flowchart of FIG. 5 may be viewed as depicting an example of steps of a method implemented in the computing environment 103 (FIG. 1) according to one or more embodiments.

FIG. 5 provides an example of the functionality that when generating the narrative using a narrative template and subject entity data 130 (FIG. 1). The narrative generation application 115 may fill in blank data fields 203 in the selected template 121 with the corresponding subject entity data 130 associated with the subject entity.

In box 503, the narrative generation application 115 determines the first sentence in the selected narrative template. For example, the narrative template may include multiple sentences. In order to create the narrative using the narrative template, the narrative generation application 115 may begin creating the narrative at the first sentence. After determining the first sentence in the narrative template, the narrative generation application 115 proceeds to box 506.

In box 506, the narrative generation application 115 determines whether narrative template includes variations of the current sentence. In various embodiments, a template may include multiple variations of the same sentence. If there are not multiple variations of the current sentence, the narrative generation application 115 proceeds to box 512. However, if there are multiple variations of the current sentence, the narrative generation application 115 proceeds to box 509.

In box 509, the narrative generation application 115 determines the optimal variation of the sentence to use based on the available subject entity data 130 associated with the subject entity 124. For example, the narrative template 118 may include the following variations of a first sentence: (1) "[NAME] was born on [BIRTHDATE] in [BIRTHPLACE] as [REAL NAME]." and (2) "[NAME] was born on [BIRTHDATE] in [BIRTHPLACE]." If the subject entity data 130 associated with the subject entity only includes a name, birthdate, birthplace, but fails to include a real name, the narrative generation application 115 may select the second sentence. After the optimal sentence is selected, the narrative generation application 115 proceeds to box 512.

In box 512, the narrative generation application 115 fills any blank data fields 203 in the sentence with the corresponding subject entity data 130 associated with the subject entity 124. For example, as illustrated in FIG. 3A, the subject entity 124 relates to deceased actor Bernie Mac. The subject entity data 130 associated with Bernie Mac includes his name (Bernie Mac), birthdate (5 Oct. 1957), birthplace (Chicago, Ill., USA), and real name (Bernard Jeffrey McCullough). The template sentence may be "[NAME] was born on [BIRTHDATE] in [BIRTHPLACE] as [REAL NAME]." Therefore, the narrative generation application 115 may generate the first sentence of the template to read: "Bernie Mac was born on 5 Oct. 1957 in Chicago, Ill., USA as Bernard Jeffrey McCullough." Following the generation of the current narrative sentence, the narrative generation application 115 proceeds to box 515.

In box 515, the narrative generation application 115 adds the current narrative sentence to the narrative. In a non-limiting example, if the current narrative sentence is the first sentence generated from the narrative template, the narrative is created and the current narrative sentence is added. However, if the current narrative sentence is a subsequent sentence from the narrative template, it will be added to the already created narrative. After adding the generated sentence to the narrative, the narrative generation application proceeds to box 518.

In box 518, the narrative generation application 115 determines whether the current sentence was the last sentence in the template. If the sentence was the last sentence in the template, the narrative generation application 115 ends. However, if the sentence was not the last sentence in the template, the narrative generation application 115 proceeds to box 521.

In box 521, the narrative generation application 115 determines the next sentence in the narrative template. In a non-limiting example, the narrative template may have a first, second and third sentence, that discuss the subject entity's birth information, movie roles, and death information respectively. If the narrative generation application 115 has already generated the first sentence, it will then determine that the second sentence should be generated. After determining the next sentence in the narrative template, the narrative generation application 115 proceeds to box 506.

Figure 6:
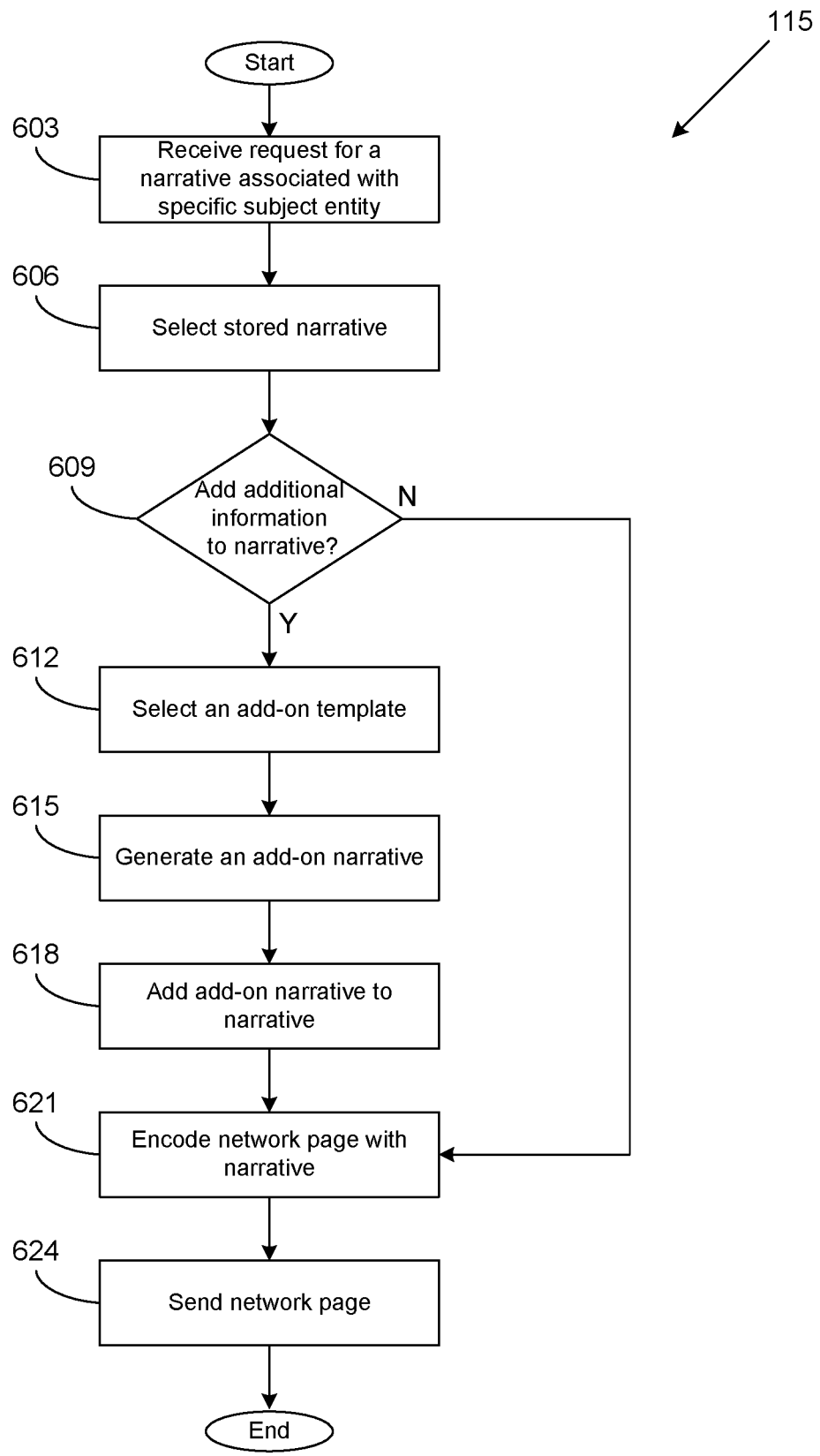

Referring next to FIG. 6, shown is a flowchart that provides one example of the operation of a portion of the narrative generation application 115 according to various embodiments. It is understood that the flowchart of FIG. 6 provides merely an example of the many different types of functional arrangements that may be employed to implement the operation of the portion of the narrative generation application 115 as described herein. As an alternative, the flowchart of FIG. 6 may be viewed as depicting an example of steps of a method implemented in the computing environment 103 (FIG. 1) according to one or more embodiments.

FIG. 6 provides an example of the functionality that may be performed following a request from a client device for a narrative 121 associated with a subject entity 124 (FIG. 1). Following the request to view a narrative, the narrative generation application 115 selects a stored narrative 121 and determines to generate in real time any additional information to add to the narrative for display on the requesting client device.

Beginning with box 603, the narrative generation application 115 receives a request to view a narrative 121 associated with an identified subject entity 130. For example, a user on a client device may want to view a narrative relating to Tom Cruise. The user may make the request through a user interface 154 on a client 106 over a network 109. The narrative generation application 115 will receive a request to view a narrative of Tom Cruise. The narrative generation application 115 may also receive information concerning the client 106 such as, for example, a locality, a language, a type of client device, type of user interface, or any other type of information regarding the client 106.

In box 606, the narrative generation application 115 may select a stored narrative associated with the identified subject entity. In one non-limiting example, the narrative may be selected by random based on an algorithm. In another non-limiting example, the selection of the narrative may be based on factors such as, for example, a type of client device, a language, an interest of the user, type of user interface, nature of network page to be rendered on the client device and/or any other information that relates to the user and/or client device.

In box 609, the narrative generation application 115 determines whether an add-on narrative may be appropriate for the real time display of the narrative. If the system determines that an add-on narrative is not appropriate or available, the narrative generation application 115 proceeds to box 621. However, if an add-on narrative is appropriate then the narrative generation application proceeds to box 612.

In box 612, the narrative generation application 115 selects an add-on template. The selection of the add-on template may be based on one or more factors such as, for example, a locality of the client, interests of the user, a language, type of client device, nature of network page to be rendered on the client device or any other information relating to the user and/or client. For example, if the user is in a location where the subject entity grew-up then an add-on narrative detailing more about the subject entity's time in that location may be interesting to the user. Therefore, the narrative generation application 115 may select an add-on template based on locality. After selecting the optimal add-on template, the narrative generation application 115 proceeds to box 615.

In box 615, the narrative generation application 115 generates the add-on narrative based at least on the add-on template 133. In one non-limiting example, the narrative generation application 115 may create an add-narrative in a similar manner as illustrated in FIG. 5. As such, the data fields in the add-on template 133 may be filled using information associated with the subject entity 124. In another non-limiting example, the add-on template 133 may not contain any data-fields to fill in and may merely be selected based on the subject entity and/or an association with the subject entity. After generating the add-on narrative, the narrative generation application 115, proceeds to box 618.

In box 618, the narrative generation application 115 adds the add-on narrative to the selected narrative 121. For example, assume that the user is located in Smyrna, Ga., and that the subject entity associated with the user's request is the actress, Julia Roberts. Julia Roberts was born in Smyrna, Ga. After selecting the appropriate narrative and generating the add-on narrative relative to Julia Roberts time growing up in Smyrna, Ga., the narrative generation application 115 may combine the two types of narratives to form the final narrative that will be displayed to the user. After adding the add-on narrative to the selected narrative 121, the narrative generation application 115 proceeds to box 621.

In box 621, the narrative generation application 115 encodes a network page with the narrative. If the narrative generation application 115 determines that an add-on narrative is to be added, the narrative encoded on the network page is only the selected stored narrative 121. However, if the narrative generation application 115 determines that an add-on narrative is to be added, the narrative encoded on the network page is the selected stored narrative 121 and the generated add-on narrative. After encoding the narrative to a network page, the narrative generation application 115 proceeds to box 624.

In box 624, the narrative generation application 115 sends the encoded network page to the client 106. After sending the encoded network page to the client 106, the narrative generation application ends.

Figure 7:
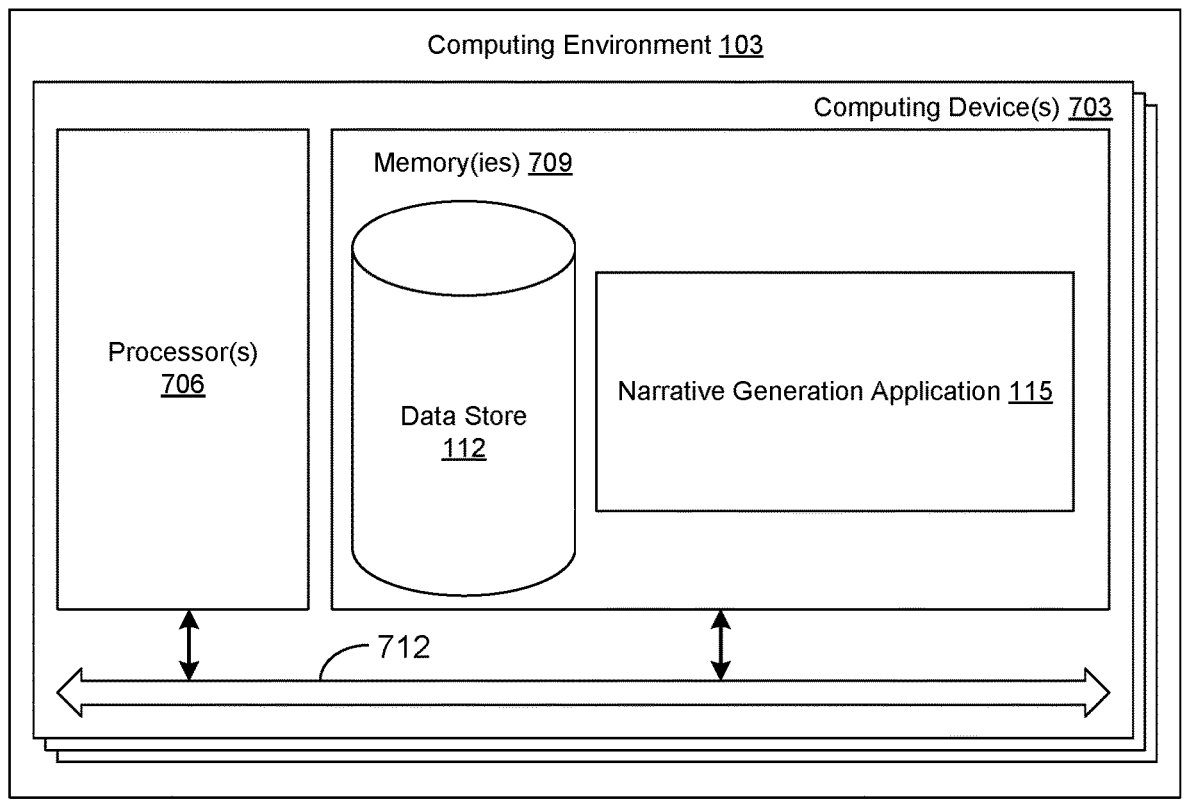
FIG. 7 is a schematic block diagram that provides one example illustration of a computing environment employed in the networked environment of FIG. 1 according to various embodiments of the present disclosure.

With reference to FIG. 7, shown is a schematic block diagram of the computing environment 103 according to an embodiment of the present disclosure. The computing environment 103 includes one or more computing devices 703. Each computing device 703 includes at least one processor circuit, for example, having a processor 706 and a memory 709, both of which are coupled to a local interface 712. To this end, each computing device 703 may comprise, for example, at least one server computer or like device. The local interface 712 may comprise, for example, a data bus with an accompanying address/control bus or other bus structure as can be appreciated.

Stored in the memory 709 are both data and several components that are executable by the processor 706. In particular, stored in the memory 709 and executable by the processor 706 are narrative generation application, and potentially other applications. Also stored in the memory 709 may be a data store 112 and other data. In addition, an operating system may be stored in the memory 709 and executable by the processor 706.

It is understood that there may be other applications that are stored in the memory 709 and are executable by the processor 706 as can be appreciated. Where any component discussed herein is implemented in the form of software, any one of a number of programming languages may be employed such as, for example, C, C++, C #, Objective C, JAVA®, JAVASCRIPT®, Perl, PHP, VISUAL BASIC®, PYTHON®, Ruby, FLASH®, or other programming languages.

A number of software components are stored in the memory 709 and are executable by the processor 706. In this respect, the term "executable" means a program file that is in a form that can ultimately be run by the processor 706. Examples of executable programs may be, for example, a compiled program that can be translated into machine code in a format that can be loaded into a random access portion of the memory 709 and run by the processor 706, source code that may be expressed in proper format such as object code that is capable of being loaded into a random access portion of the memory 709 and executed by the processor 706, or source code that may be interpreted by another executable program to generate instructions in a random access portion of the memory 709 to be executed by the processor 706, etc. An executable program may be stored in any portion or component of the memory 709 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 709 is defined herein as including both volatile and nonvolatile memory and data storage components. Volatile components are those that do not retain data values upon loss of power. Nonvolatile components are those that retain data upon a loss of power. Thus, the memory 709 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 706 may represent multiple processors 706 and/or multiple processor cores and the memory 709 may represent multiple memories 709 that operate in parallel processing circuits, respectively. In such a case, the local interface 712 may be an appropriate network that facilitates communication between any two of the multiple processors 706, between any processor 706 and any of the memories 709, or between any two of the memories 709, etc. The local interface 712 may comprise additional systems designed to coordinate this communication, including, for example, performing load balancing. The processor 706 may be of electrical or of some other available construction.

Although the narrative generation application, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4-6 show the functionality and operation of an implementation of portions of the narrative generation application. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 706 in a computer system or other system. The machine code may be converted from the source code, etc. If embodied in hardware, each block may represent a circuit or a number of interconnected circuits to implement the specified logical function(s).

Although the flowcharts of FIGS. 4-6 show a specific order of execution, it is understood that the order of execution may differ from that which is depicted. For example, the order of execution of two or more blocks may be scrambled relative to the order shown. Also, two or more blocks shown in succession in FIGS. 4-6 may be executed concurrently or with partial concurrence. Further, in some embodiments, one or more of the blocks shown in FIGS. 4-6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the narrative generation application, that comprises software or code can be embodied in any non-transitory computer-readable medium for use by or in connection with an instruction execution system such as, for example, a processor 706 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   at least one computing device; and
   an application executable by the at least one computing device, wherein, when executed, the application causes the at least one computing device to at least:
      select, based at least in part on a popularity of a subject entity represented in subject entity data corresponding to the subject entity, a narrative template from a plurality of narrative templates, the narrative template comprising a plurality of data fields associated with the subject entity;
      generate a narrative by populating the plurality of data fields in the narrative template with the subject entity data corresponding to the subject entity in response to a detection of at least one of an addition of a data element in the subject entity data, a removal of the data element in the subject entity data, or a modification of the data element in the subject entity data;
      receive a request for the narrative from a client device; and
      transmit the narrative to the client device.

2. The system of claim 1, wherein selecting the narrative template is further based at least in part on a language or a type of device.

3. The system of claim 1, wherein, when executed, the application further causes the at least one computing device to at least modify the narrative to include additional information about the subject entity.

4. The system of claim 1, wherein, when executed, the application further causes the at least one computing device to at least:
select an add-on template based at least in part on a location of the client device or user account information associated with the client device; and
generate an add-on narrative according to the add-on template.

5. The system of claim 4, wherein, when executed, the application further causes the at least one computing device to at least append the add-on narrative to an end of the narrative, and the narrative being transmitted to the client device including the add-on narrative.

6. The system of claim 1, wherein the narrative template includes a plurality of sentence options for a particular sentence in the narrative template, and wherein, when executed, the application further causes the at least one computing device to at least select a particular sentence option from the plurality of sentence options based at least in part on the subject entity data.

7. The system of claim 1, wherein, when executed, the application further causes the at least one computing device to at least store the narrative in a data store, the narrative replacing a previously stored narrative of the subject entity.

8. The system of claim 1, wherein, when executed, the application further causes the at least one computing device to at least translate at least one data element from the data element into a language of the narrative template to obtain at least one translated data element, the at least one translated data element being used to populate one of the plurality of data fields in the narrative template.

9. A method, comprising:
determining, via at least one computing device, to generate a plurality of narratives associated with a subject entity;
selecting, via the at least one computing device and based at least in part on a popularity of the subject entity represented in subject entity data corresponding to the subject entity, at least one of a plurality of narrative templates;
generating, via the at least one computing device, the plurality of narratives based at least in part on the plurality of narrative templates in response to detecting a change in the subject entity data corresponding to the subject entity, individual narratives differing from one another according to at least one of a language or a type of client device; and
storing, via the at least one computing device, the plurality of narratives in a data store.

10. The method of claim 9, wherein the at least one of the plurality of narrative templates comprises a plurality of data fields associated with the subject entity.

11. The method of claim 9, wherein a particular narrative template is in a particular language, and further comprising translating, via the at least one computing device, at least one data element associated with the subject entity into the particular language, the at least one translated data element being used to populate a data field for the particular narrative template.

12. The method of claim 9, further comprising:
receiving, via the at least one computing device, a request for a narrative of the subject entity from a client device;
selecting, via the at least one computing device, a particular narrative from a plurality of stored narratives based at least in part on user account data, a locale of the client device, or the type of client device; and
transmitting, via the at least one computing device, a user interface including the particular narrative to the client device.

13. The method of claim 9, further comprising updating, via the at least one computing device, a particular narrative of the plurality of narratives based at least in part on a detection of a change to subject entity data associated with the subject entity.

14. The method of claim 13, wherein updating the particular narrative further comprises:
selecting, via the at least one computing device, an additional narrative template based at least in part on the change;
generating, via the at least one computing device, an updated narrative based at least in part on the subject entity data and the additional narrative template; and
replacing, via the at least one computing device, the particular narrative with the updated narrative in the data store.

15. A system, comprising:
at least one computing device; and
at least one application executable in the at least one computing device, wherein, when executed, the at least one application causes the at least one computing device to at least:
receive a request from a client device for a narrative associated with a subject entity;
identify a plurality of stored narratives associated with the subject entity;
select, based at least in part on a popularity of the subject entity and a type of client device, a particular stored narrative, the particular stored narrative being selected based at least in part on the popularity being represented in subject entity data corresponding to the subject entity;
generate an add-on narrative by populating a plurality of fields in an add-on template with subject entity data corresponding to the subject entity in response to at least one of an addition of data corresponding to the subject entity, a removal of data corresponding to the subject entity, or a modification of data corresponding to the subject entity; and
transmit a user interface including the particular stored narrative and the add-on narrative to the client device.

16. The system of claim 15, wherein at least two of the plurality of stored narratives differ from one another according to a language such that a first stored narrative is in a first language and a second stored narrative is in a second language.

17. The system of claim 15, wherein at least two of the stored narratives differ from one another according to the type of client device such that a first stored narrative is supported by a first type of client device and a second stored narrative is supported by a second type of client device.

18. The system of claim 15, wherein selecting the particular stored narrative is further based at least in part on an interest of a user associated with the client device.

19. The system of claim 15, wherein, when executed, the at least one application further causes the at least one computing device to at least:

select the add-on template from a plurality of add-on templates based at least in part on a location of the client device, a user interest, a language, or the type of client device.

20. The system of claim 15, wherein, when executed, the at least one application further causes the at least one computing device to at least combine the particular stored narrative with the add-on narrative.

* * * * *